United States Patent [19]
Smith

[11] Patent Number: 5,677,849
[45] Date of Patent: Oct. 14, 1997

[54] SELECTIVE LOW POWER CLOCKING APPARATUS AND METHOD

[75] Inventor: Stephen Arthur Smith, Palo Alto, Calif.

[73] Assignee: Cirrus Logic, Inc., Fremont, Calif.

[21] Appl. No.: 581,480

[22] Filed: Dec. 20, 1995

Related U.S. Application Data

[63] Continuation of Ser. No. 148,378, Nov. 8, 1993, abandoned.

[51] Int. Cl.⁶ ........................................ G06F 1/32
[52] U.S. Cl. .................. 364/492; 364/707; 395/750
[58] Field of Search .................... 364/141, 492, 364/493, 707, 569; 395/550, 750; 377/81

[56] References Cited

U.S. PATENT DOCUMENTS

| | | | |
|---|---|---|---|
| 4,218,876 | 8/1980 | Hashimoto et al. | 368/10 |
| 4,317,181 | 2/1982 | Teza et al. | 364/707 |
| 4,390,022 | 6/1983 | Calfee et al. | 128/419 |
| 4,404,972 | 9/1983 | Gordon et al. | 128/419 |
| 4,570,219 | 2/1986 | Shibukawa et al. | 364/200 |
| 4,615,005 | 9/1986 | Maejima et al. | 364/707 X |
| 4,656,649 | 4/1987 | Takahashi | 377/48 |
| 4,665,536 | 5/1987 | Kim | 377/16 |
| 4,731,814 | 3/1988 | Becker et al. | 379/62 |
| 5,128,974 | 7/1992 | Maekawa | 377/81 |
| 5,162,667 | 11/1992 | Yasui et al. | 307/272.2 |
| 5,276,889 | 1/1994 | Shiraishi et al. | 395/750 |
| 5,452,401 | 9/1995 | Lin | 395/750 |

*Primary Examiner*—Emanuel T. Voeltz
*Assistant Examiner*—M. Kemper
*Attorney, Agent, or Firm*—Thomas B. Haverstock; Robert P. Bell; J. P. Violette

[57] ABSTRACT

A selective low power clocking apparatus and method is used to reduce power consumption by an electronic system or integrated circuit that is coupled to an external system via a system bus which is configured to selectively transmit or receive signals from the electronic system or integrated circuit. The electronic system or integrated circuit includes a plurality of sub-circuits or functional blocks. Each sub-circuit or functional block is configured to operate under control of a clock signal and further includes an apparatus for holding or rejecting the clock signal. Once each sub-circuit within the electronic system or integrated circuit rejects the clock signal, the clock signal to that sub-circuit is disabled. The arbiter circuit continuously monitors the system bus. Upon detecting that the external system needs to transmit or receive signals from the electronic system or integrated circuit, the arbiter re-enables the clock signal to the sub-circuits which are required for the transmission or reception.

28 Claims, 2 Drawing Sheets

SELECTIVE LOW POWER CLOCKING APPARATUS AND METHOD

This is a Continuation of application Ser. No. 08/148,378 filed on Nov. 8, 1993 now abandoned.

FIELD OF THE INVENTION

This invention relates generally to electronic systems having selective application of a clock signal to multiple sub-circuits within that electronic system. More particularly, the invention preferably relates to an integrated circuit design which conserves power by gating the generation of the clock signal individually to its multiple sub-circuits when they do not require a clock signal.

BACKGROUND OF TEE INVENTION

Within each electronic system or integrated circuit are many sub-circuits or functional blocks which all work together to perform operations required by the CPU. Each synchronous sub-circuit within the electronic system or integrated circuit is supplied a clock signal from either the external system clock or a clock internal to the electronic system or integrated circuit. This clock signal is used to synchronize the operation of the integrated circuit and to toggle a response signal through the functional blocks, integrated circuit or electronic system. For all synchronous functional blocks the clock is used as the timing reference to ensure that each synchronous functional block will execute its operations in the sequence that they are to occur.

For certain types of circuits, including CMOS circuits, power consumption is increased as a result of the circuit being exercised, eg., by a clock signal. Typical digital systems employ multiple integrated circuit chips. As is well understood, each chip typically performs a limited number of functions for the system, for example, to control a semiconductor memory, to control a hard disk, to control a screen display and other related functions. Periodically, each of these circuits is not needed and is idle insofar as system functionality is concerned. Unfortunately, because these circuits continue to receive a clock signal, their respective internal circuits continue to be exercised and consume significant electric power, even while idle.

Lower power consumption is desirable for all electronic systems, but especially for portable computers which are supplied power from a battery with a finite lifetime. Conserving power in a portable computer will mean that the user can use their computer for a longer period of time before it is necessary to replace or recharge the battery, which supplies power to the portable computer.

One method used to reduce the time that the clock signal is supplied to an integrated circuit is used in PCMCIA Most Adapters, part Nos. C1-PD6710/PD672X, which are supplied by Cirrus Logic, Inc. This method teaches simultaneously dis-abling the clock signal to all of the functional blocks, after all of the functional blocks has signalled that they no longer require the clock signal. An arbiter circuit then monitors the system bus and will re-enable the clock signal to all of the functional blocks simultaneously, when an address within the range controlled by the arbiter and a corresponding command are present on the system bus. The disadvantage of this system is that the power savings can only be realized when the entire circuits of the C1-PD6710/PD672X become temporarily inactive.

What is needed is an apparatus and method which allows an electronic system or integrated circuit to selectively turn off the clock signal provided to its functional blocks during the time when the sub-circuits are not required for operation and allows the clock signal to be restored very rapidly when the functional blocks are necessary to the operation of the electronic system or integrated circuit. What is also needed is an apparatus and method which can turn off the clock signal to functional blocks within an electronic system or integrated circuit and keep the fact that the clock signal is turned off to those functional blocks transparent to both the system bus and the user.

SUMMARY OF THE INVENTION

A selective low power clocking apparatus and method is used to reduce power consumption by an electronic system or integrated circuit that is coupled to an external system via a system bus which is configured to selectively transmit or receive signals from the electronic system or integrated circuit. The electronic system or integrated circuit includes a plurality of sub-circuits or functional blocks. Each sub-circuit or functional block is configured to operate under control of a clock signal and further includes an apparatus for holding or rejecting the clock signal. Once each sub-circuit within the electronic system or integrated circuit rejects the clock signal, the clock signal to that sub-circuit is disabled. The arbiter circuit continuously monitors the system bus. Upon detecting that the external system needs to transmit or receive signals from the electronic system or integrated circuit, the arbiter re-enables the clock signal to the sub-circuits which are required for the transmission or reception.

DETAILED DESCRIPTION OF THE PREFERRED EMBODIMENT

Figure 1:
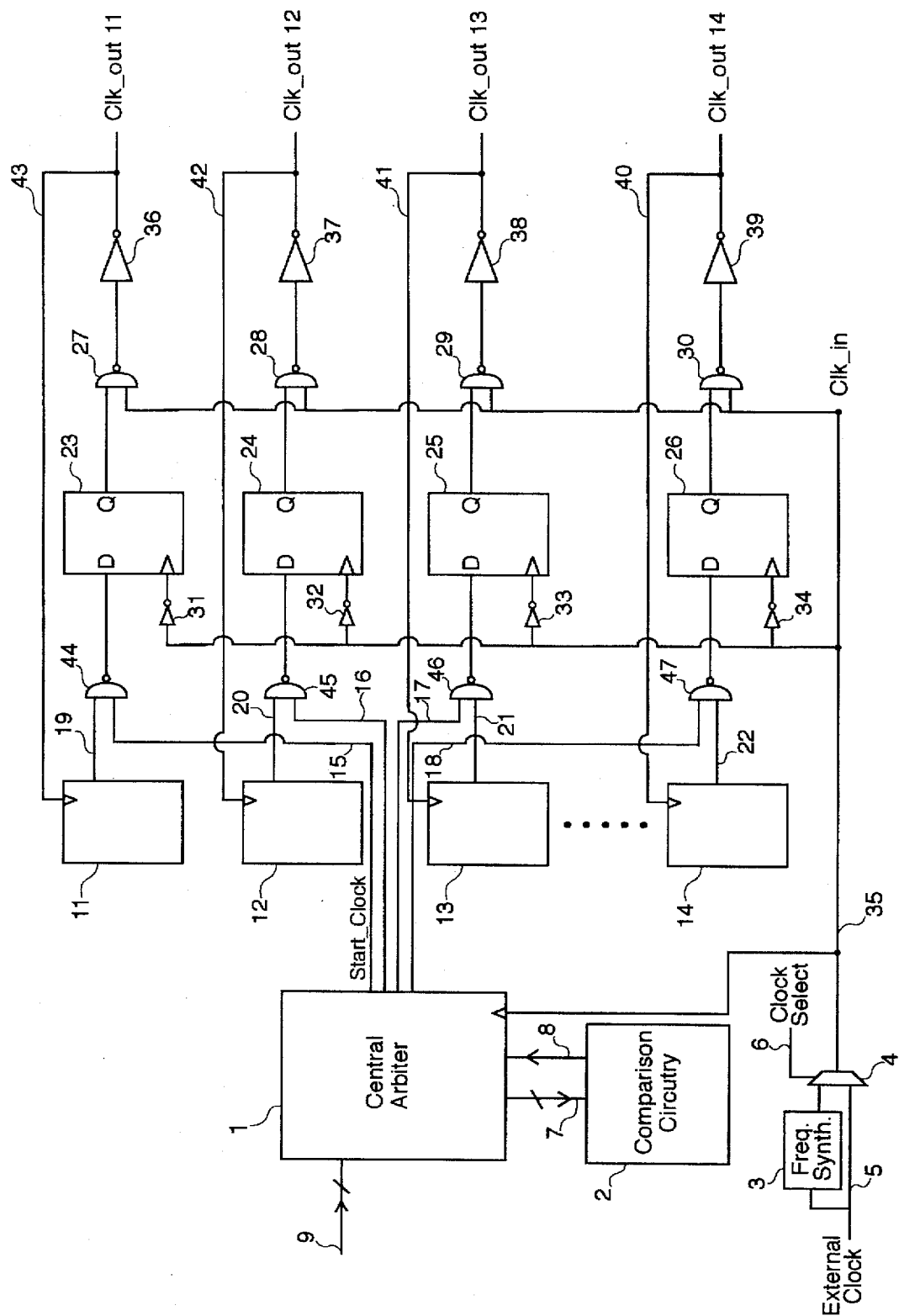
FIG. 1 illustrates a schematic diagram of the selective low power clocking apparatus of the present invention.

The selective low power clocking apparatus of the present invention is illustrated in FIG. 1. Each of the functional blocks 11–14 is provided a clock signal when the central arbiter 1 anticipates that the operation of the respective functional block will be necessary for completion of the operation. Once a functional block 11–14 is provided with a clock signal, the clock signal to that block will not be disabled until the functional block 11–14 has completed its required operations and no longer needs the clock signal.

Providing a clock signal to each of the functional blocks 11–14 is preferably accomplished in the same manner for all of the functional blocks 11–14. The central arbiter 1 and the comparison circuitry 2 monitor the system bus 9 for addresses within the range controlled by the central arbiter 1 and for specific corresponding commands, whose completion will require the operation of this electronic system or integrated circuit. When an address within the controlled range and a specific corresponding command is detected, the central arbiter 1 then determines which functional blocks 11–14 will be necessary for completion of its task. Once the central arbiter 1 determines which functional blocks 11–14 will be required for operation, the central arbiter 1 pulls the respective Start__Clock signal lines 15–18 to a logical low voltage level, causing the output of the respective NAND gates 44–47 to switch from a logical low voltage level to a logical high voltage level. The respective clock signals 40–43 are then provided to the functional blocks 11–14 which are required for operation by the central arbiter 1 until they have completed their operations and no longer require a clock signal.

The clock signal to a particular functional block 11–14 is disabled when the particular functional block 11–14 raises its respective Kill_Clock signal line output 19–22 to a logical high voltage level and the appropriate one of the Start_Clock signal lines 15–18 for that functional block is also at a logical high voltage level, causing the output of the individual NAND gate 44–47 to switch from a logical high voltage level to a logical low voltage level.

The system bus 9 is coupled as an input to the central arbiter 1. The central arbiter 1 is coupled to the comparison circuitry 2 through the address lines 7 which provide the address from the system bus 9 to the comparison circuitry 2. The comparison circuitry 2 is also coupled to the central arbiter 1 through the control line 8 which informs the central arbiter 1 when the address on the address lines 7 is in the range of addresses controlled by the central arbiter 1.

The Start_Clock signal line output 15 from the central arbiter 1 is coupled as an input to the NAND gate 44 for restoring the clock signal to the functional block 11. The Start_Clock signal line output 16 from the central arbiter 1 is coupled as an input to the NAND gate 45 for restoring the clock signal to the functional block 12 when its operation is necessary. The Start_Clock signal line output 17 from the central arbiter 1 is coupled as an input to the NAND gate 46 for restoring the clock signal to the functional block 13 when its operation is necessary. The Start_Clock signal line output 18 from the central arbiter 1 is coupled as an input to the NAND gate 47 for restoring the clock signal to the functional block 14 when its operation is necessary.

The Kill_Clock signal line output 19 of the functional block 11 is coupled as the other input to the NAND gate 44 to signal when the functional block 11 no longer requires a clock signal. The Kill_Clock signal line output 20 of the functional block 12 is coupled as the other input to the NAND gate 45 to signal when the functional block 12 no longer requires a clock signal. The Kill_Clock signal line output 21 of the functional block 13 is coupled as the other input to the NAND gate 46 to signal when the functional block 13 no longer requires a clock signal. The Kill_Clock signal line output 22 of the functional block 14 is coupled as the other input to the NAND gate 47 to signal when the functional block 14 no longer requires a clock signal.

The external clock signal 5 is provided as an input to the multiplexer 4 and to the frequency synthesizer 3. The output of the frequency synthesizer 3 is also provided as an input to the multiplexer 4. The clock select signal line 6 is coupled as an input to the multiplexer 4 and can be used to select between the external clock signal 5 or the clock signal which is output from the frequency synthesizer 3. The frequency synthesizer 3 can be used to multiply or divide the external clock signal. In the preferred embodiment of the present invention, the frequency synthesizer 3 multiplies the external clock signal by the value of 7/4. The clock output signal 35 from the multiplexer 4 is coupled to the clock input of the central arbiter 1.

The output of the NAND gate 44 is coupled as the D input of the flip-flop 23. The Q output of the flip-flop 23 is coupled as an input to the NAND gate 27. The clock output signal 35 from the multiplexer 4 is provided as an input to the inverter 31 and as the other input of the NAND gate 27. The output signal from the inverter 31 is coupled to the clock input of the flip-flop 23. The output from the NAND gate 27 is coupled to the input of the inverter 36 and the output signal 43 from the inverter 36 is coupled as the clock signal input to the functional block 11.

The output of the NAND gate 45 is coupled as the D input of the flip-flop 24. The Q output of the flip-flop 24 is coupled as an input to the NAND gate 28. The clock output signal 35 from the multiplexer 4 is provided as an input to the inverter 32 and as the other input of the NAND gate 28. The output signal from the inverter 32 is coupled to the clock input of the flip-flop 24. The output from the NAND gate 28 is coupled to the input of the inverter 37 and the output signal 42 from the inverter 37 is coupled as the clock signal input to the functional block 12.

The output of the NAND gate 46 is coupled as the D input of the flip-flop 25. The Q output of the flip-flop 25 is coupled as an input to the NAND gate 29. The clock output signal 35 from the multiplexer 4 is provided as an input to the inverter 33 and as the other input of the NAND gate 29. The output signal from the inverter 33 is coupled to the clock input of the flip-flop 25. The output from the NAND gate 29 is coupled to the input of the inverter 38 and the output signal 41 from the inverter 38 is coupled as the clock signal input to the functional block 13.

The output of the NAND gate 47 is coupled as the D input of the flip-flop 26. The Q output of the flip-flop 26 is coupled as an input to the NAND gate 30. The clock output signal 35 from the multiplexer 4 is provided as an input to the inverter 34 and as the other input of the NAND gate 30. The output signal from the inverter 34 is coupled to the clock input of the flip-flop 26. The output from the NAND gate 30 is coupled to the input of the inverter 39 and the output signal 40 from the inverter 39 is coupled as the clock signal input to the functional block 14.

Only the operation of the functional block 11 and its accompanying circuitry will be described in detail because in the preferred embodiment each group of circuitry accompanying each functional block operates in the same manner. The Kill_Clock line 19 notifies the NAND gate 44 when the functional block 11 still requires the clock signal 43 for its operations. As long as any of the inputs to the NAND gate 44 are at a logical low voltage level then the output from the NAND gate 44 will be at a logical high voltage level and the clock signal 43 will be provided to the functional block 11. When the functional block 11 completes its operations and no longer requires the clock signal 43 it will raise its Kill_Clock signal line 19 to a logical high voltage level. As soon as the Kill_Clock signal line 19 and the Start_Clock signal line 15 are at a logical high voltage level the output of the NAND gate 44 switches from a logical high voltage level to a logical low voltage level and the clock signal 43 is then disabled or pulled to a constant logical low voltage level.

The clock signal 43 remains disabled until the central arbiter 1 and the comparison circuitry 2 determine that the functional block 11 will require the clock signal 43. The comparison circuitry 2 uses the address value on the system bus 9 and compares that address value to lookup tables or to hard-wired internal chip registers to determine if the address value on the system bus 9 is within the range of addresses controlled by the central arbiter 1. If the address value specified on the system bus 9 is within the range of addresses controlled by the central arbiter 1 then the control line 8 is raised to a logical high voltage level and the central arbiter 1 is notified that an address is present on the system bus 9 which is in its control. The central arbiter 1 then determines whether or not a corresponding command is also present on the system bus 9. If the central arbiter 1 determines that the functional block 11 will require a clock signal it will pull the Start_Clock signal line 15 to a logical low voltage level causing the output of the NAND gate 44 to rise to a logical high voltage level. The clock signal 43 is then re-enabled, or coupled to match the output signal 35 from the multiplexer 4, and the functional block 11 is provided with the clock signal 43. In the preferred embodiment of the present invention, the central arbiter 1 specifically monitors the system bus 9 for commands involving any bus transactions to a register, including Input/Output Read or Write and Memory Read or Write commands, within the electronic system or integrated circuit or any transaction to circuitry controlled by the system. When an address within the range controlled by the central arbiter 1 and one of these specific commands is detected, then the central arbiter 1 determines which one or more of the functional blocks 11–14 should be provided with a clock signal.

Once the command on the system bus 9 is not one of the specific commands that the central arbiter 1 is configured to respond to and the address specified on the system bus 9 is no longer in the address range controlled by the central arbiter 1 or the operation of the functional block is no longer required, the central arbiter 1 will then raise the Start_Clock signal line 15 to a logical high voltage level to signal that it no longer requires the clock signal for the functional block 11. The clock signal 43 will remain active however, until the functional block 11 has completed its tasks and has raised its Kill_Clock signal line 19 to a logical high voltage level. The clock signal 43 is then disabled until the comparison circuitry 2 instructs the central arbiter 1 that the address specified on the system bus 9 is within the range of addresses which the central arbiter 1 is controlling and the central arbiter 1 detects one of the specific commands that it is configured to respond to and the operation of the functional block 11 is required for completion of the task.

The system bus used in the preferred embodiment of the present invention is an ISA bus which has a 16 bit wide data path and a 24 bit wide address bus. The ISA bus is asynchronous and operates with system clock rates of 6 MHz to 12 MHz.

Figure 2:
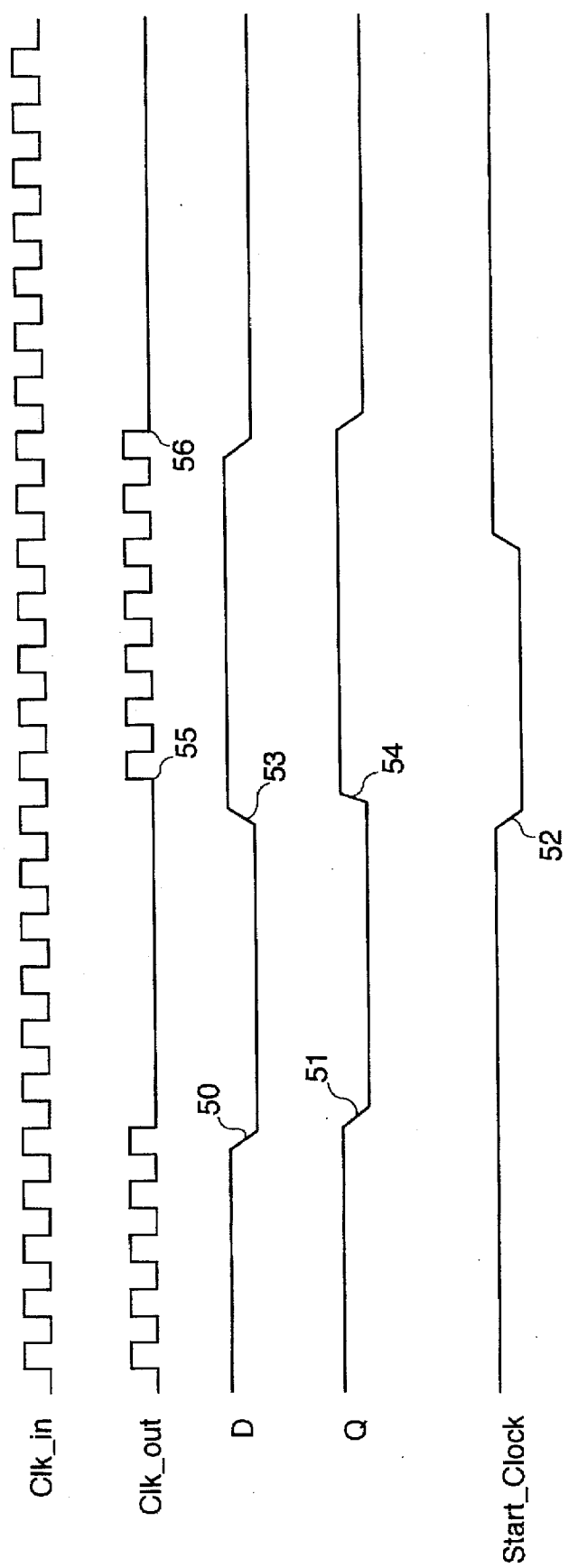
FIG. 2 illustrates a timing diagram of the outgoing clock signal in response to the incoming clock signal, the Kill__Clock signal line and the Start__Clock signal line for an individual functional block.

FIG. 2 illustrates a timing diagram which shows the timing of the operation of a functional block of the selective low power clocking apparatus of the present invention. The output clock signal 35 from the multiplexer 4 is illustrated at the top of FIG. 2 by the Clk_in waveform, the clock signal line 43 output from the inverter 36 is illustrated as the Clk_out waveform, the D input to the flip-flop 23 is illustrated as the D waveform, the Q output from the flip-flop 23 is illustrated as the Q waveform and the Start_Clock signal line 15 from the central arbiter 1 is illustrated as the Start_Clock waveform. While only the timing of the functional block 11 and its accompanying circuitry is illustrated and described in detail, it will be apparent to one of reasonable skill in the art that the timing and operation of the other functional blocks 12–14 and their accompanying circuitry is identical to the timing and operation of the functional block 11 and its accompanying circuitry.

Upon startup, the integrated circuit of the preferred embodiment is brought up in its low power clock mode, with the clock signal 43 to the functional block 11 disabled. When operation of the functional block 11 is required for operation of the integrated circuit, the central arbiter 1 pulls the Start_Clock signal line 15 to a logical low voltage level, causing the Clk_out signal to be activated and the clock signal 43 to be provided to the functional block 11. The central arbiter 1 will then raise the Start_Clock signal line 15 to a logical high voltage level if the address specified on the system bus 9 is not within the range of addresses controlled by the central arbiter 1 and the command on the system bus 9 is not one of the specific commands that the central arbiter 1 is looking for, or if the central arbiter 1 determines that the functional block 11 is no longer needed to complete the required tasks. Then, once the functional block 11 has completed its required operations and no longer needs the clock signal 43, it will raise its Kill_Clock signal line 19 to a logical high voltage level, causing the output of the NAND gate 44 and the D input of the flip-flop 23 to switch from a logical high voltage level to a logical low voltage level as is illustrated in FIG. 2 at the time 50. In response to the D input of the flip-flop 23 changing, the Q output of the flip-flop 23 then switches from a logical high voltage level to a logical low voltage level on the next negative clock edge of the Clk_in signal, illustrated in FIG. 2 at the time 51. At this same clock edge, the Clk_out signal is disabled so that the functional block 11 is not provided with a clock signal. Because the operation of the flip-flop 23 is controlled by the negative edge of the clock signal Clk_in, the clock signal Clk_out is disabled when it is already at a logical low voltage level, allowing disabling of the clock signal to occur without glitches, noise pulses or runt pulses.

When the Clk_out signal is disabled, the central arbiter 1 and the comparison circuitry 2 monitor all of the addresses and commands on the system bus 9, until one of the addresses within the range controlled by the central arbiter 1 and one of the specific corresponding commands appears on the system bus 9. When one of the specific commands and addresses within the range of control appears on the system bus 9, the central arbiter 1 determines whether or not the functional block 11 is needed for completion of this operation. If the central arbiter 1 determines that the functional block 11 is needed for completion of this operation, then the central arbiter 1 pulls the Start_Clock signal line 15 to a logical low voltage as illustrated at the time 52 and the Clk_out signal is re-enabled. In response to the Start_Clock signal line 15 switching to a logical low voltage level, the output of the NAND gate 44 switches from a logical low voltage level to a logical high voltage level, causing the D input of the flip-flop 23 to do the same, as illustrated at the time 53 in FIG. 2. On the next negative clock edge of the Clk_in signal, the Q output from the flip-flop 23 switches from a logical low voltage level to a logical high voltage level, as illustrated at the time 54 in FIG. 2. In response to the Q output of the flip-flop 23 changing, the Clk_out signal will be re-enabled, beginning at the next positive clock edge as illustrated at the time 55. Because the clock signal Clk_out is at a logical low voltage level when the clock signal is disabled, the present invention is designed so that the clock signal will always restart on the next positive edge of the clock signal Clk_in.

The signal Clk_out stays enabled until the central arbiter 1 raises the Start_Clock signal line 15 to a logical high voltage level and the functional block 11 raises its Kill_Clock signal line 19 to a logical high voltage level, signalling that it has completed its required operations and no longer requires the clock signal 43. When this happens, the output of the NAND gate 44 switches from a logical high voltage level to a logical low voltage level causing the D input of the flip-flop 23 to do the same. In response to the D input changing, on the next negative clock signal edge, the Q output is pulled to a logical low voltage level and the Clk_out signal is disabled as illustrated in FIG. 2 at the time 56. The clock signal 43 then remains disabled until the central arbiter 1 pulls the Start_Clock signal line 15 to a logical low voltage level.

After the clock signal 43 to the functional block 11 has been disabled, the clock signal 43 cannot be re-enabled and provided to those circuits until the central arbiter 1 pulls the Start_Clock signal line 15 to a logical low voltage level. The functional blocks 11-14 can only signal that they no longer require a clock signal 40-43, but cannot signal that they need a clock signal 40-43, once it has been disabled. Once the clock signals 40-43 have been disabled, the central arbiter 1 must then continuously monitor the system bus 9 and the comparison circuitry 2 so that it knows when the functional blocks 11-14 are required for operation and will need their respective clock signals 40-43.

In order for the central arbiter 1 and the comparison circuitry to continuously monitor the system bus 9, they must either be provided a clock signal at all times or preferably be designed as an asynchronous circuit. In the preferred embodiment of the present invention, the output clock signal 35 from the multiplexer 4 is always provided to the inverters 31-34, to the flip-flops 23-26 and to the NAND gates 27-30. The output clock signal 35 from the multiplexer 4 is also coupled to always be provided to the central arbiter 1 for the parts of the central arbiter 1 which are synchronous and require the clock signal in order to monitor the system bus and the comparison circuitry 2. The comparison circuitry 2 is designed to be asynchronous so that it does not require a clock signal to make its comparisons of the addresses on the system bus 9 and to notify the central arbiter 1 when the address on the system bus 9 is within the range of addresses controlled by the central arbiter 1.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. An electronic system having a selective low power clocking apparatus, the electronic system comprising:
   a. a plurality of clock driven functional blocks, each having an active mode and an inactive mode and each of the functional blocks comprising means for generating a kill signal when the corresponding functional block no longer requires a clock signal;
   b. a clock signal generating circuit for providing the clock signal to each of the functional blocks;
   c. an arbiter circuit for determining whether each of the functional blocks will transition from the inactive mode to the active mode during a clock cycle by examining a set of commands; and
   d. a logic circuit coupled to receive the kill signal for selectively disabling the clock signal to a functional block wherein that functional block enters the inactive mode during the clock cycle.

2. The electronic system according to claim 1 further comprising a comparison circuit for comparing an address in each of the commands with a predetermined set of addresses, wherein the arbiter circuit determines whether each of the functional blocks will transition from the inactive mode to the active mode based on the comparison.

3. An electronic system having a selective low power clocking apparatus, the electronic system comprising:
   a. a clock signal;
   b. means for determining when each of a plurality of functional blocks require a clock signal; and
   c. means for providing the clock signal selectively, to one or more of the plurality of functional blocks, for selectively enabling one or more of the plurality of functional blocks only when the means for determining has determined that the particular functional block requires the clock signal, the means for providing coupled to the clock signal and to the means for determining.

4. The electronic system as claimed in claim 3 wherein the means for determining is comprised of a central arbiter and comparison circuitry for comparing addresses and commands on a system bus to addresses in a lookup table and corresponding commands.

5. The electronic system as claimed in claim 4 wherein each of the plurality of functional blocks have a selection apparatus for holding or rejecting the clock signal once the clock signal has been provided by the means for providing.

6. The electronic system as claimed in claim 5 wherein the means for providing disables the clock signal to the plurality of functional blocks after being rejected by the selection apparatus after a negative clock edge and before a positive clock edge, and wherein the means for providing provides the clock to the plurality of functional blocks starting with a positive clock edge.

7. The electronic system as claimed in claim 6 wherein the clock signal can be selected from either an external clock signal or the output of a frequency synthesizer.

8. An electronic system having a selective low power clocking apparatus, the electronic system comprising:
   a. a clock signal;
   b. a plurality of functional blocks, each functional block configured to operate under control of the clock signal and further including a selection apparatus for holding or rejecting the clock signal; and
   c. an arbiter for determining when each of the functional blocks requires the clock signal and for selectively providing the clock signal to each of the functional blocks when it is determined that they require the clock signal.

9. The electronic system as claimed in claim 8 further comprising comparison circuitry for comparing addresses and commands on a system bus to addresses in a lookup table and corresponding commands, the comparison circuitry coupled to the arbiter.

10. The electronic system as claimed in claim 9 wherein the clock signal can be selected from either an external clock signal or the output of a frequency synthesizer.

11. The integrated circuit as claimed in claim 10 wherein the central arbiter disables the clock signal to the plurality of functional blocks after being rejected by the selection apparatus, after a negative clock edge and before a positive clock edge, and wherein the central arbiter provides the clock signal to the plurality of functional blocks beginning with a positive clock edge.

12. An electronic system having a low power clocking apparatus, the electronic system comprising:
   a. a clock signal;
   b. a plurality of clock driven functional blocks coupled to receive the clock signal; and
   c. a central arbiter coupled to a system bus for determining whether one of the plurality of functional blocks requires the clock signal and for providing the clock signal to such a functional block, the central arbiter comprising:

i. a first logic circuit for determining when one of a predetermined set of addresses is present on the system bus;

ii. a second logic circuit for determining when one of a predetermined set of commands is present on the system bus; and iii. a third logic circuit for determining which one or more of the functional blocks requires the clock signal, when one of the set of addresses and one of the set of commands are present on the system bus.

13. The electronic system as claimed in claim 12 further comprising comparison circuitry coupled to the central arbiter for notifying the central arbiter when one of the first plurality of addresses is present on the system bus.

14. A selective low power method for providing a clock signal to a plurality of functional blocks within an electronic system, the method comprising the steps of:

a. obtaining the clock signal b. examining a set of commands to determine when a particular one or more of the plurality of functional blocks will require the clock signal; and c. selectively providing the clock signal to the particular one or more of the plurality of functional blocks which have been determined to require the clock signal, wherein the step of examining further comprises the step of comparing an address in each of the commands with a predetermined set of addresses.

15. A method of conserving power in an electronic system processing a command, the electronic system comprising a plurality of functional blocks to process the command, each functional block conserving power when disabled, the method comprising the steps of:

a. disabling each functional block;

b. examining the command to determine whether a functional block is required to process the command;

c. selectively enabling the functional blocks required to process the command d. receiving a signal from a functional block when the functional block indicates that the command is completed; and e. disabling the functional block in response to the signal.

16. The method of claim 15 wherein the step of selectively enabling comprises the step of providing a clock signal to the functional blocks required to process the command.

17. A method of conserving power in an electronic system processing a command, the electronic system comprising a plurality of function blocks to process the command, each function block conserving power when disabled, the method comprising the steps of:

a. disabling the function block;

b. examining the command to determine whether each functional block is required to process the command; and c. selectively enabling only the functional blocks required to process the command whereby power is conserved, wherein the step of selectively disabling comprises the step of not providing a clock signal to the functional blocks not required to process the command.

18. A low power clocking apparatus in an electronic system comprising a plurality of clock driven functional blocks to process a set of commands, the low power clocking apparatus comprising:

a. a first circuit to determine when each of the functional blocks is required to process the commands by examining the commands and to enable the clock signal to a particular functional block when the particular functional block is required to process the commands; and b. a second circuit, coupled to the particular functional block, for receiving a signal from the functional block indicating that the functional block has completed the command and for disabling the clock signal to the particular functional blocks in response to the signal.

19. A low power clocking apparatus in an electronic system comprising a plurality of clock driven functional blocks to process a set of commands, the low power clocking apparatus comprising:

a. a first circuit to determine when each of the functional blocks is required to process the commands by examining the commands and to enable a clock signal to the particular functional blocks when the particular functional blocks are required to process the commands; and b. a second circuit to disable a clock signal to the particular functional blocks when the particular functional blocks are not required to process the commands, wherein the first circuit comprises:

a. a comparator to compare an address in each command with a set of predetermined addresses; and b. an arbiter determining whether to enable the clock signal to the particular functional blocks based upon the comparison.

20. The low power clocking apparatus of claim 19 wherein each of the functional blocks is capable of sending a kill signal to disable the clock signal.

21. The low power clocking apparatus of claim 20 wherein the clock signal is capable of being selected from an external clock signal or the output of a frequency synthesizer.

22. The low power clocking apparatus of claim 20 wherein the second circuit comprises:

a. a logic gate coupled to receive the kill signal and an output of the comparator indicative of whether to disable the clock signal to a particular functional block; and b. a flip-flop coupled to the output of the logic gate and the clock signal, the flip-flop not generating the clock signal on an output of the flip-flop if either the kill signal or the output of the comparator indicates disabling the clock signal to the particular functional block.

23. An apparatus for controlling a clock signal to a plurality of functional blocks, said apparatus comprising:

an arbiter for determining when each of a plurality of functional blocks require a clock signal; and a clock controller, coupled to the arbiter and receiving the clock signal, for selectively enabling one or more of the plurality of functional blocks after the arbiter has determined that the particular functional block requires the clock signal.

24. The apparatus of claim 23, wherein said arbiter comprises:

a first comparator for comparing a received address on an address bus with a predetermined range of addresses and for outputting a signal indicating at least one of the plurality of functional blocks is to be activated in response to the received address.

25. The apparatus of claim 24, wherein said arbiter further comprises:

a second comparator for receiving a command over a data bus and for determining whether the command requires operation of one or more of the plurality of functional blocks and for outputting a clock activation signal indicating that a corresponding functional block is to be activated.

26. The apparatus of claim 25, wherein said clock controller comprises:

a plurality of clock activation circuits coupled to the second comparator, each of said plurality of clock activation circuits corresponding to a one of said plurality of functional blocks, each of said plurality of clock activation circuits for receiving the clock signal and controlling the clock signal to a corresponding one of said plurality of functional blocks in response to the clock activation signal.

27. The apparatus of claim 26, wherein said clock controller further comprises:

a plurality of clock deactivation circuits, each coupled to a corresponding one of said plurality of functional blocks, for receiving a signal from a corresponding functional block indicating a command has been completed by the functional block and deactivating the clock signal to the corresponding functional block in response to the signal.

28. The apparatus of claim 27, wherein each of said plurality of clock deactivation circuits receives the clock activation signal and suppresses deactivation of a clock signal to a corresponding one of said plurality of functional blocks if the clock activation signal indicates that the corresponding one of said plurality of functional blocks is to be activated.

* * * * *